(12) United States Patent
Kossett

(10) Patent No.: US 7,051,854 B2
(45) Date of Patent: May 30, 2006

(54) DUAL PRESS-FIT WRAP SPRING CLUTCH

(75) Inventor: John Kossett, Vadnais Heights, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 6 days.

(21) Appl. No.: 10/826,647

(22) Filed: Apr. 16, 2004

(65) Prior Publication Data

US 2005/0230212 A1   Oct. 20, 2005

(51) Int. Cl.
*F16D 13/04* (2006.01)

(52) U.S. Cl. .................... 192/35; 192/81 C; 192/84.81

(58) Field of Classification Search ................. 192/35, 192/36, 81 C, 84.1, 84.8, 84.81
See application file for complete search history.

(56) References Cited

U.S. PATENT DOCUMENTS

| | | | | | |
|---|---|---|---|---|---|
| 4,263,995 | A | * | 4/1981 | Wahlstedt | 192/35 |
| 4,465,171 | A | * | 8/1984 | Koyama | 192/84.81 |
| 4,502,578 | A | * | 3/1985 | Koyama | 192/26 |
| 4,638,899 | A | | 1/1987 | Kossett | |
| 5,099,974 | A | * | 3/1992 | Spechko | 192/84.81 |
| 5,251,735 | A | * | 10/1993 | Lamoureux | 192/84.81 |
| 5,687,822 | A | * | 11/1997 | Arai | 192/84.81 |
| 5,918,716 | A | * | 7/1999 | Arcaro | 192/84.81 |
| 5,967,274 | A | * | 10/1999 | Leone et al. | 192/35 |
| 6,138,808 | A | * | 10/2000 | Wussow | 192/84.81 |

* cited by examiner

*Primary Examiner*—Saul Rodriguez
(74) *Attorney, Agent, or Firm*—Dicke, Billig & Czaja, PLLC

(57) ABSTRACT

A wrap spring clutch including a drive shaft, an output hub, a shoulder, a hub, a wrap spring, a bushing, and a control ring. The drive shaft is configured to rotate about an axis. The output hub is mounted over the drive shaft and is configured with a first groove. The shoulder is fixed to the drive shaft and configured to rotate therewith. The hub is fixed to the drive shaft and is configured to rotate therewith. The wrap spring is helically wrapped about the drive shaft and over the hub. The wrap spring also includes a first wrap end and a second wrap end. The first wrap end is press fit into the first groove. The bushing is mounted over the drive shaft and the bushing has a first portion and a second portion. The first portion is coupled between the drive shaft and the second wrap end. The control ring is mounted over the drive shaft and fixed to the second portion of the bushing thereby defining a second groove. The second wrap end is press fit into the second groove. The control ring is controllably pulled against the shoulder causing the wrap spring to wrap down onto the hub such that the drive shaft and output hub rotate together.

20 Claims, 2 Drawing Sheets

US 7,051,854 B2

DUAL PRESS-FIT WRAP SPRING CLUTCH

BACKGROUND

The present invention relates to a wrap spring clutch. The wrap spring clutch is configured with double-ended spring press.

A wrap spring clutch is a well-known mechanism for alternately transferring rotation from an input rotation source to some output and then detaching the source of input rotation from the output. The wrap spring clutch has an input, and output with a wrap spring coupled between them. The wrap spring is wrapped open or wrapped down to connect and disconnect the input to the output, thereby engaging and disengaging the clutch. This invention relates to spring clutch mechanisms and to improved means for anchoring the ends of the helical clutch spring.

Attachment between the wrap spring the input or the output in spring clutch mechanisms has previously been accomplished by several other methods. In one, a tab or tang extending either axially or radially from an end turn of the helical coil spring is inserted into a slot or cavity in the input or output transmitting member. In another method, the several end turns of the wrap spring are frictionally secured to the input or output transmitting drum, e.g. by reducing the diameter of the turns, or by increasing the number of contacting coils or the diameter of the drum. A further method involves the placing of a separate compressible split ring about the several end turns of the spring.

The shaping of the spring wire to provide a partially constricted diameter or an additional tang involves added expense and production requirements. An axial tang requires an axial cavity and limits desirable reduction in thickness of the member receiving the tang. A spring restrained by a tang is subject to "humping", a condition in which the adjacent coils do not return fully to their initial diameter and so cause an alteration of the "at rest" position of clutch-connected mechanism. The incorporation of a compressible split ring involves additional expense both in components and in assembly, and increases space requirements.

SUMMARY

The present invention is a wrap spring clutch. The spring clutch includes a drive shaft, an output hub, a shoulder, a hub, a wrap spring, a bushing, and a control ring. The drive shaft is configured to rotate about an axis. The output hub is mounted over the drive shaft and is configured with a first groove. The shoulder is fixed to the drive shaft and configured to rotate therewith. The hub is fixed to the drive shaft and is configured to rotate therewith. The wrap spring is helically wrapped about the drive shaft and over the hub. The wrap spring also includes a first wrap end and a second wrap end. The first wrap end is press fit into the first groove. The bushing is mounted over the drive shaft and the bushing has a first portion and a second portion. The first portion is coupled between the drive shaft and the second wrap end. The control ring is mounted over the drive shaft and fixed to the second portion of the bushing thereby defining a second groove. The second wrap end is press fit into the second groove. The control ring is controllably pulled against the shoulder causing the wrap spring to wrap down onto the hub such that the drive shaft and output hub rotate together.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
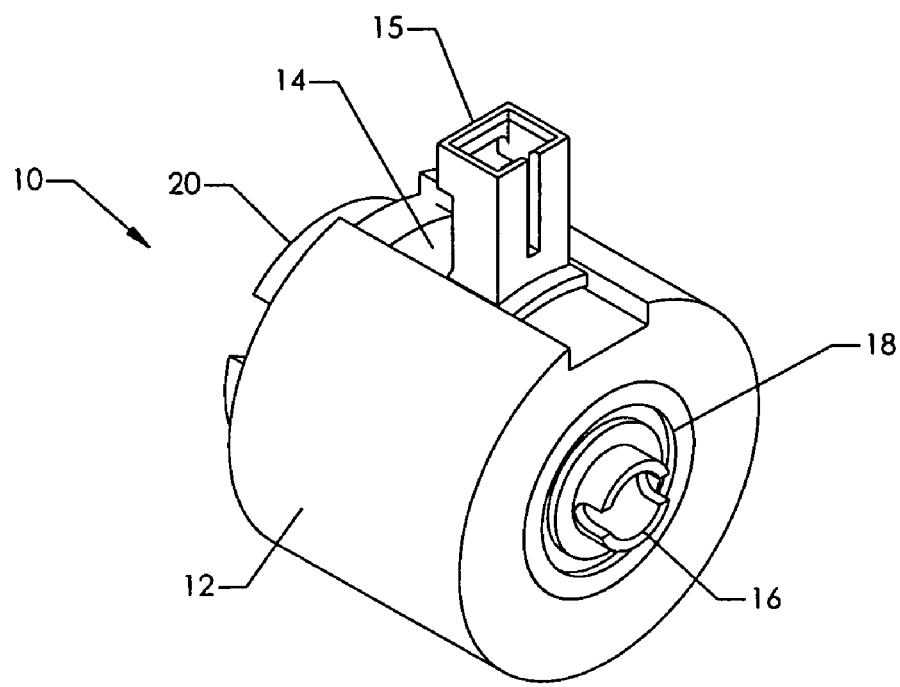
FIG. 1 illustrates a perspective view of one embodiment of a wrap spring clutch in accordance with the present invention.
Figure 2:
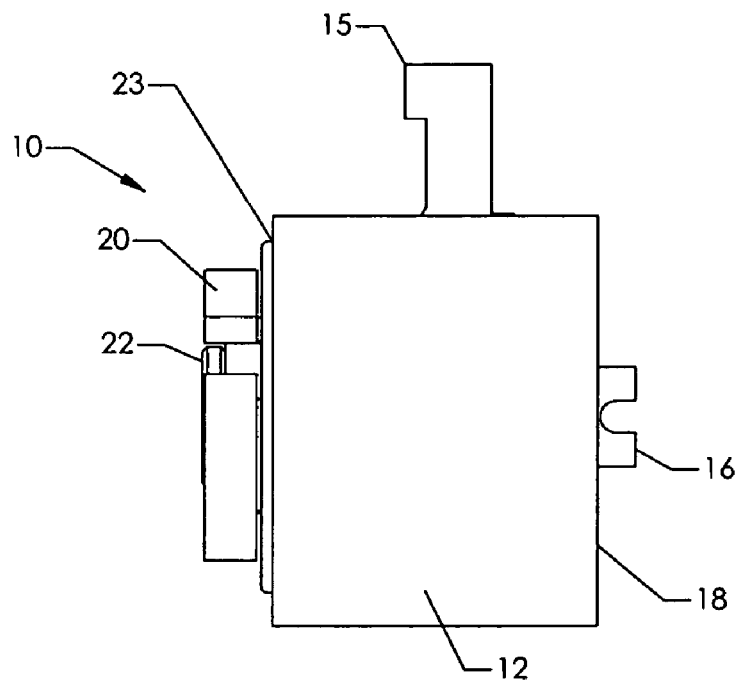
FIG. 2 illustrates a side view of one embodiment of a wrap spring clutch in accordance with the present invention.

FIGS. 1 and 2 illustrate respective perspective and side views of wrap spring clutch 10 in accordance with the present invention. Clutch 10 includes case 12, coil 14, coil connecter 15, drive shaft 16, bearing 18, output member 20, retaining ring 22 and seal 23. Case 12 contains the various components of the clutch and protects them from outside environment. Bearing 18 is mounted over drive shaft 16 and holds the various components on drive shaft 16 as will be discussed in more detail below.

In operation, a source of input rotation is attached to drive shaft 16, a source of electrical energy is coupled to coil connecter 15, and output member 20 is attached to a load that is desired to be controllably rotated. When electrical energy is provided to clutch 10 via coil connecter 15, clutch 10 couples drive shaft 16 to output member 20 such that they rotate together, thereby transferring the input rotation to the load. When electrical energy is no longer provided to clutch 10 via coil connecter 15, clutch 10 uncouples drive shaft 16 from output member 20 such that output member 20 no longer rotates, thereby ending the rotation of the load. In an alternative application of this embodiment, output member 20 may be coupled to the input rotation source and drive shaft 16 may be coupled to the output to alternately couple and uncouple the load to the input rotation source.

Figure 3:
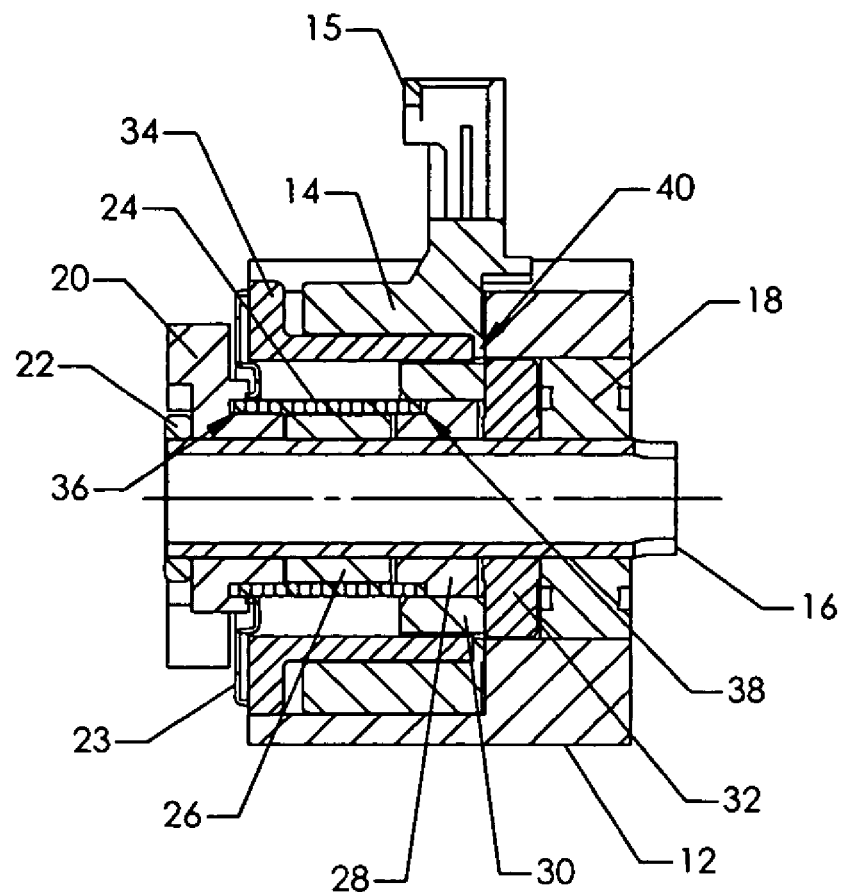
FIG. 3 illustrates a cross-sectional view of one embodiment of a wrap spring clutch in accordance with the present invention.

FIG. 3 illustrates a cross-section of wrap spring clutch 10 in accordance with the present invention. Portions of clutch spring 10 have been cut away to show more detail of the device. Clutch 10 includes case 12, coil 14, coil connecter 15, drive shaft 16, bearing 18, output member 20, retaining ring 22, seal 23, wrap spring 24, hub 26, bushing 28, control ring 30, shoulder 32 and tube 34. Coil 14, bearing 18, output member 20, retaining ring 22, seal 23, wrap spring 24, hub 26, bushing 28, control ring 30, shoulder 32 and tube 34 are all mounted about drive shaft 16. Bearing 18 on one end of shaft 16 and retaining ring 22 on another end of shaft 16, hold that various components axially on drive shaft 16. In addition, bearing 18 supports case 12, coil 14 and tube 34 radially with respect to drive shaft 16 such that drive shaft 16 rotates freely within them. Hub 26, shoulder 32, and retaining ring 22 are all press fit or otherwise fixed to drive shaft 16 such that they all rotate together. Output member 20 is mounted over drive shaft 16 and is free to rotate over it when clutch 10 is disengaged. In one embodiment, drive shaft 16 is generally cylindrical as are components mounted over it such as tube 34 and case 12.

In one embodiment, drive shaft 16, hub 26 and shoulder 32 are each manufactured as individual components and all press fit or otherwise fixed together such that they all rotate as a unit. In another embodiment, a drive shaft is configured as a single unit that also includes and hub 26 and a shoulder 32 formed as part of drive shaft 16. Alternatively, a drive shaft 16 may include only a shoulder 32 as part of the unit, and hub 26 may then be press fit over the combination drive shaft 16 and shoulder 32. Various other alternatives are possible, including forming shaft 16 and retaining ring 22 as a unitary piece.

Output member 20 is configured to provide output groove 36 into which wrap spring 24 fits. Similarly, bushing 28 and control ring 30 are configured to, in combination, provide control groove 38 into which wrap spring 24 also fits. Output and control grooves 36 and 38 are configured to uniquely retain wrap spring 24 in clutch 10 in accordance with the present invention.

In one embodiment of clutch 10, drive shaft 16 is coupled to a source of input rotation so that it rotates therewith. When clutch 10 is disengaged, output member 20 does not rotate, and drive shaft 16 rotates freely within output member 20. When electrical energy is provided to clutch 10 via coil connecter 15, however, current flows in coil 14. The current running through coil 14 establishes a magnetic field that is perpendicular to the current running through coil 14. Thus, the magnetic field is parallel to drive shaft 16. The magnetic field tends to run through tube 34 and case 12 because of the magnetic properties of those materials. The magnetic field must then "jump" over gap 40, which separates tube 34 from case 12. Since control ring 30 also is configured with magnetic field-enhancing properties, the magnetic field tends to run through control ring 30 rather than over gap 40. In this way, control ring 30 will tend to move toward, and contact, shoulder 32 with the magnetic field set up by coil 14.

Since shoulder 32 is fixed to drive shaft 16, this contact between control ring 30 and shoulder 32 tends to rotate control ring 30 with shoulder 32. Since wrap spring 24 is press fit between control ring 30 and bushing 28, wrap spring 24 will also rotate and thus wrap down onto hub 26, which is fixed to drive shaft 16. In this way, providing electrical energy to clutch 10 via coil connecter 15 engages clutch 10 such that output member 20 rotates with drive shaft 16. Once the electrical energy is removed from clutch 10, current no longer flows through coil 14 and the magnetic field dissipates. Thus, control ring 30 moves away from shoulder 32 allowing wrap spring 24 to wrap open off of hub 26 thereby disengaging clutch 10 such that output member 20 no longer rotates with drive shaft 16.

The connection of wrap spring 24 to output member 20 on one end and to control ring 30 on the other end is accomplished by a press fit into output groove 36 and control groove 38, respectively. Output groove 36 is formed directly into output member 20, and when assembled with wrap spring 24 has a clearance that is just slightly less than the height of wrap spring 24. Thus, wrap spring 24 is press fit into output groove 36. Similarly, bushing 28 and control ring 30 in combination form control groove 38 with a clearance that is just slightly less than the height of wrap spring 24. Thus, wrap spring 24 is press fit into control groove 38. In this way, wrap spring 24 does not require any tangs or spring toes at the ends of the wrap spring 24 in order to secure wrap spring 24 to output member 20 and to control ring 30. Instead, wrap spring 24 is completely helically wound about shaft 16 and its ends press fit into output groove 36 and control groove 38.

By firmly securing wrap spring 24 at both ends with no tangs or spring toes, but with press fits on both sides, clutch 10 has superior performance characteristics over prior designs. A single wrap spring solidly supported in this way on both its ends gives a more stable and smooth performance than prior designs.

Wrap spring clutch 10 in accordance with the present invention requires a slightly larger radial width than prior designs. Since bushing 28 extends between the wrap spring 24 and shaft 16 and control ring 30 extends between wrap spring 24 and tube 34, the distance between shaft 16 and tube 34 must accommodate both bushing 28 and control ring 30. Thus, the radial size of clutch 10 must be larger than prior designs. This slightly larger radial size accommodates the securing of wrap spring 24 without the use of tangs or toes and thereby provides superior performance.

In one embodiment, wrap spring clutch 10 is designed including both bushing 28 and control ring 30. Since bushing 28 and control ring 30 are two separate parts, the control ring 30 can be configured with magnetic field-enhancing characteristics such that to will be drawn against shoulder 32 when coil 14 is energized, whereas bushing 28 will not have such magnetic field-enhancing characteristics. In this way, the magnetic field induced in tube 34 and control ring 30 will not be enhanced down through bushing 28. Maximizing the magnetic field control ring 30 ensures that enough attraction is created between control ring 30 and shoulder 32 to move control ring 30 against shoulder 32. Since the axial spring forces in wrap spring 24 must be overcome to move control ring 30 against shoulder 32, maximizing the magnetic field may be important in some embodiments. If the magnetic field is allowed to leak down into bushing 28, it will decrease the strength of the magnetic field in control ring 30.

Figure 4:
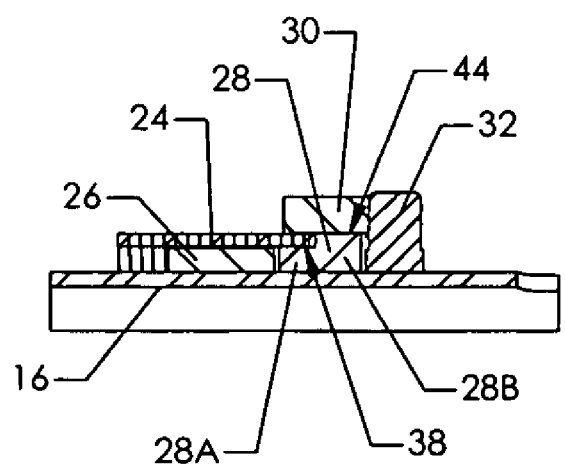
FIG. 4 illustrates a partial cross-sectional view of one embodiment of a wrap spring clutch in accordance with the present invention.

Control groove 38, into which wrap spring 24 is press fit, is established by assembling bushing 28 and control ring 30 together. FIG. 4 illustrates a portion of clutch 10 in cross-sectional view, which includes bushing 28 and control ring 30. As illustrated in FIG. 4, bushing 28 has an L-shaped portion as viewed in cross-section, with a forward potion 28A and a rear portion 28B. Wrap spring 24 in wrapped over forward portion 28A abuts rear portion 28B. The windings that comprise wrap spring 24 have a height in a direction perpendicular relative to shaft 16 such that they define wrap spring top surface 42. Similarly, bushing 28, and specifically rear portion 28B extends perpendicular relative to shaft 16 to define a bushing surface 44. In one embodiment, bushing surface 44 is slightly closer to shaft 16 than is wrap spring top surface 42. In this way, when control ring 30 is assembled over bushing 28, and brought flush with bushing surface 44, it will be forced over an end portion of wrap spring 24 creating a solid press fit in control groove 38, which is also created when control ring 30 is assembled over bushing 28. This two-piece assembly also provides flexibility in assembling clutch 10, which provides advantages manufacturing the clutch.

For ease of description, FIG. 4, and the discussion relating thereto, only focuses on a portion of clutch 10. One skilled in the art will recognize, however, that the discussion relates to the entire clutch 10. For example, discussions relating to wrap spring 24 having a height in a direction perpendicular relative to shaft 16 apply equally to wrap spring 24 above and below drive shaft 16 as illustrate in FIG. 3. Any such directional terminology is used for purposes of illustration and is in no way limiting.

Configuring bushing 28 and control ring 30 as two separate parts also allows the parts to be configured of material that is tailored to the specific function of the particular part. For example, since control ring 28 will be configured to be pulled against shoulder 32 while rotating, it should be configured of a material well suited for wear. Since bushing 28 is configured to act as a bushing over shaft 16, it should be configured of a material well suited for that function. Since the parts are separate in one embodiment, they each can be differently and specially tailored to their own function.

Since control ring 30 is configured to move axially toward shoulder 32 when coil 14 is energized and to move away from shoulder 32 when coil 14 is de-energized, wrap spring 24 is configured to have flexibility axially. In this way, in one embodiment wrap spring 24 has an equilibrium position that is close wound, that is, each of the windings of wrap spring 24 touch the adjacent windings. Consequently, in its equilibrium position wrap spring 24 will hold control ring 30 away from shoulder 32, because of its press fit into control groove 38. When coil 14 is energized, the magnetic field established in control ring 30 will cause control ring 30 to be magnetically attracted to shoulder 32, which is made of some metallic material, to stretch wrap spring 24 axially such that control ring 30 engages shoulder 32. FIG. 3 illustrates clutch 10 in this engaged state where control ring 30 engages shoulder 32. When clutch 10 is not engaged, control ring 30 is separated from shoulder 32 by a small gap such that there is no wear between the two in this non-engaged state.

Clutch 10 in accordance with the invention provides superior performance to prior clutch designs. The performance is smooth and balanced in part due to the smooth torque transition from the ends of wrap spring 24 to grooves 36 and 38. Unlike prior designs where at least on of the wrap spring ends have a spring tang or toe, the ends of wrap spring 24 are free of any bends and thereby provide an end with a continuity of torque transfer that more closely follows the helical coil transitions of wrap spring 24.

Where tangs, toes or bends are used to secure a wrap end, these bends interrupt the transition from the helical wrap and cause some binding forces in the bend. The force at the bend is not a pure torque transfer and the force is actually a perpendicular force that is discontinuous with torque transfer. Clutch 10 provides a superior performance with its smooth transition of torque.

The tangs, toes and bends of prior designs also add to the cost of manufacture of a wrap, whereas a purely helical wrap is simpler and less expensive to manufacture.

Finally, the tangs, toes and bends of prior designs also are self-engaging at high speeds. In other words, even where the clutch is not energized to form the magnetic field to engage the clutch, it engages anyway when the input is running at speeds over 1000 rpm because of oscillation allowed by the discontinuous torque transfer of the bends or toes. With the ends of wrap spring 24 being free of any bends and thereby providing a continuity of torque transfer, clutch 10 in accordance with the present invention is not self-engaging.

Although, the present invention has been described with reference to preferred embodiments, workers skilled in the art will recognize that changes may be made in form and detail without departing from the spirit and scope of the invention. For example, variable speed clutch 10 can also be combined with a mirror image of the unit to operate in a bi-direction manner.

What is claimed is:

1. A wrap spring clutch comprising:
    a drive shaft with a shoulder and a hub, all configured to rotate about an axis;
    an output member mounted over the drive shaft, the output member configured with a first groove;
    a wrap spring helically wrapped about the drive shaft and over the hub, the wrap spring having a first wrap end and a second wrap end, wherein the first wrap end is press fit into the first groove;
    a bushing mounted over the drive shaft, the bushing having a first portion and a second portion, wherein the first portion is coupled between the drive shaft and the second wrap end; and
    a control ring mounted over the drive shaft and fixed to the second portion of the bushing thereby defining a second groove and also thereby press fitting the second wrap end into the second groove, wherein the control ring is controllably pulled against the shoulder thereby causing the wrap spring to wrap down onto the hub such that the drive shaft and output member rotate together.

2. The wrap spring clutch of claim 1 wherein the drive shaft, the shoulder and the hub are all configured as a single part.

3. The wrap spring clutch of claim 1 wherein the drive shaft, the shoulder and the hub are all configured as individual parts and assembled together.

4. The wrap spring clutch of claim 1 wherein the wrap spring is fully helical having no tang or spring toe at either the first or second wrap end.

5. The wrap spring clutch of claim 1 wherein the wrap spring has a height in a perpendicular direction relative to the axis of the shaft thereby defining a wrap spring surface, wherein the second portion of the bushing has a height in a perpendicular direction relative to the axis of the shaft thereby defining a bushing surface, and wherein the bushing surface is closer to the axis of the shaft than is the wrap spring surface.

6. The wrap spring clutch of claim 5 wherein control ring is fixed to the bushing surface such that the control ring presses against the wrap spring surface thereby creating the press fit over the second wrap end.

7. The wrap spring clutch of claim 1 further including a tube mounted over the drive shaft, the bushing, the wrap spring and the control ring, and a case mounted over the tube.

8. The wrap spring clutch of claim 7 further including a coil wound about the tube and generally perpendicular to the tube and case such that when electrical current flows in the coil, an electromagnetic field is established in the tube and case.

9. The wrap spring clutch of claim 8 wherein the tube and case are separated by a gap adjacent the control ring such that the electromagnetic field is established through the control ring thereby causing the control ring to be pulled against the shoulder.

10. The wrap spring clutch of claim 1, wherein the wrap spring is axially flexible such that it flexes to allow the bushing and the control ring to move axially against the shoulder when electrical current flows in the coil.

11. A wrap spring clutch comprising:
    a drive shaft with a shoulder and a hub all configured to rotate about an axis;

an output member mounted over the drive shaft, the output member configured with a first groove;

a wrap spring helically wrapped about the drive shaft and over the hub, the wrap spring having a first wrap end and a second wrap end, wherein the first wrap end is press fit into the first groove; and control means mounted over the drive shaft for providing a second groove into which the second wrap end is press fit, wherein the control means is controllably pulled against the shoulder thereby causing the wrap spring to wrap down onto the hub such that the drive shaft and output member rotate together.

12. The wrap spring clutch of claim 11, wherein the control means includes a bushing and a control ring mounted over the drive shaft, wherein the control ring is coupled to the bushing thereby defining the second groove into which the second wrap end is press fit.

13. The wrap spring clutch of claim 12, wherein the bushing has a first portion and a second portion, wherein the first portion is coupled between the drive shaft and the second wrap end, and wherein the control ring is coupled to the second portion of the bushing.

14. The wrap spring clutch of claim 11 wherein the wrap spring is fully helical having no tang or spring toe at either the first or second wrap end.

15. The wrap spring clutch of claim 13 wherein the wrap spring has a height in a perpendicular direction relative to the axis of the shaft thereby defining a wrap spring surface, wherein the second portion of the bushing has a height in a perpendicular direction relative to the axis of the shaft thereby defining a bushing surface, and wherein the bushing surface is closer to the axis of the shaft than is the wrap spring surface.

16. The wrap spring clutch of claim 15 wherein control ring is fixed to the bushing surface such that the control ring presses against the wrap spring surface thereby creating the press fit.

17. The wrap spring clutch of claim 11 further including a tube mounted over the drive shaft, the control means, and the wrap spring, and a case mounted over the tube.

18. The wrap spring clutch of claim 17 further including a coil wound about the tube and generally perpendicular to the tube and case such that when electrical current flows in the coil, an electromagnetic field is established in the tube and case.

19. The wrap spring clutch of claim 18 wherein the tube and case are separated by a gap adjacent the control ring such that the electromagnetic field is established through the control ring thereby causing the control ring to be pulled against the shoulder.

20. The wrap spring clutch of claim 11, wherein the wrap spring is axially flexible such that it flexes to allow the control means to move axially against the shoulder when electrical current flows in the coil.

\* \* \* \* \*